United States Patent
Kunimochi

(10) Patent No.: US 9,535,204 B2
(45) Date of Patent: Jan. 3, 2017

(54) ILLUMINATION APPARATUS HAVING LIGHT GUIDE PLATE WITH CURVEDLY TAPERED LIGHT COUPLING PORTION

(71) Applicant: MINEBEA CO., LTD., Kitasaku-gun, Nagano (JP)

(72) Inventor: Toru Kunimochi, Fukuroi (JP)

(73) Assignee: MINEBEA CO., LTD., Kitasaku-Gun (JP)

( * ) Notice: Subject to any disclaimer, the term of this patent is extended or adjusted under 35 U.S.C. 154(b) by 307 days.

(21) Appl. No.: 14/318,301

(22) Filed: Jun. 27, 2014

(65) Prior Publication Data
US 2015/0226908 A1 Aug. 13, 2015

(30) Foreign Application Priority Data
Feb. 12, 2014 (JP) .................................. 2014-024436

(51) Int. Cl.
G02B 6/10 (2006.01)
F21V 8/00 (2006.01)
G02B 6/28 (2006.01)

(52) U.S. Cl.
CPC ............. *G02B 6/0046* (2013.01); *G02B 6/002* (2013.01); *G02B 6/0028* (2013.01); *G02B 6/28* (2013.01)

(58) Field of Classification Search
CPC ............. F21V 2200/17; F21V 2200/20; F21V 2200/15; G02B 6/0028; G02B 6/0013; G02B 6/0073
See application file for complete search history.

(56) References Cited

U.S. PATENT DOCUMENTS

| | | | | |
|---|---|---|---|---|
| 3,437,804 A * | 4/1969 | Schaefer | ............. | G02B 6/4206 313/113 |
| 4,763,975 A * | 8/1988 | Scifres | ................. | G02B 6/2552 385/115 |
| 5,861,815 A * | 1/1999 | Wernig | .................. | G01D 11/28 340/691.1 |
| 6,044,196 A | 3/2000 | Winston et al. | | |
| 7,484,873 B2 * | 2/2009 | Dejima | .................. | G02B 6/002 362/606 |
| 8,049,839 B2 * | 11/2011 | Han | ...................... | G02B 6/0036 349/65 |
| 8,213,762 B2 * | 7/2012 | Kayanuma | ........... | G02B 6/0018 385/130 |
| 8,801,253 B2 * | 8/2014 | Krupa | ...................... | A61B 1/07 362/555 |

(Continued)

FOREIGN PATENT DOCUMENTS

CN 1216370 A 5/1999
CN 104007578 A 8/2014
(Continued)

*Primary Examiner* — Ismael Negron
(74) *Attorney, Agent, or Firm* — Oliff PLC

(57) ABSTRACT

An illumination apparatus includes a light source, and a light guide plate having an emitting surface and a light incident portion including a curved surface, and decreasing in thickness from the light source side towards the emitting surface. The curved surface has an S-shape as viewed from a side, with a convex portion on the light source side and a concave portion on the emitting surface with an inflection point in between, but closer to the emitting surface than to the source side.

16 Claims, 9 Drawing Sheets

(56) References Cited

U.S. PATENT DOCUMENTS

| | | | |
|---|---|---|---|
| 8,939,633 B2 * | 1/2015 | Yabe | G02B 6/0028 362/620 |
| 2004/0130912 A1 * | 7/2004 | Miyashita | G02B 6/002 362/561 |
| 2006/0269189 A1 * | 11/2006 | Seo | G02B 6/0028 385/39 |
| 2008/0159693 A1 * | 7/2008 | Chang | G02B 6/0028 385/31 |
| 2011/0205759 A1 | 8/2011 | Kurata et al. | |
| 2011/0222311 A1 | 9/2011 | Kinder | |
| 2015/0098249 A1 * | 4/2015 | Song | G02B 6/002 362/612 |

FOREIGN PATENT DOCUMENTS

| | | | |
|---|---|---|---|
| JP | H11-306830 A | | 11/1999 |
| JP | 2007-005015 A | | 1/2007 |
| JP | A-2007-287550 | | 11/2007 |
| JP | A-2008-170739 | | 7/2008 |
| JP | 2009-081014 A | | 4/2009 |
| JP | 2009081014 A | * | 4/2009 |
| JP | 2009-245669 A | | 10/2009 |
| JP | 2010-044994 A | | 2/2010 |
| JP | 2010-204518 A | | 9/2010 |
| JP | A-2011-96522 | | 5/2011 |
| JP | 2012-022863 A | | 2/2012 |
| WO | 20101060033 A1 | | 5/2010 |
| WO | 20111019785 A1 | | 2/2011 |

* cited by examiner

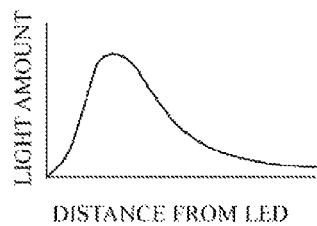
F I G. 3 A
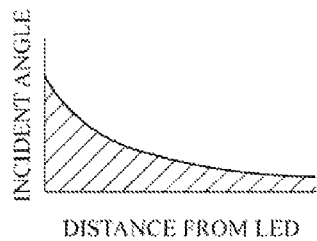
F I G. 3 B
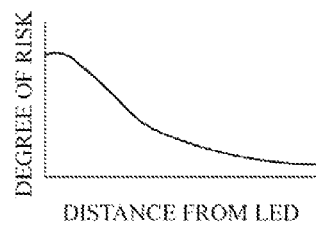
F I G. 3 C
F I G. 4
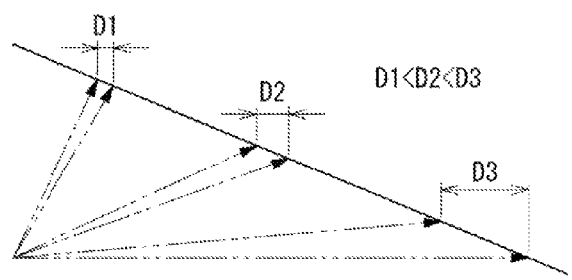

F I G. 7 B
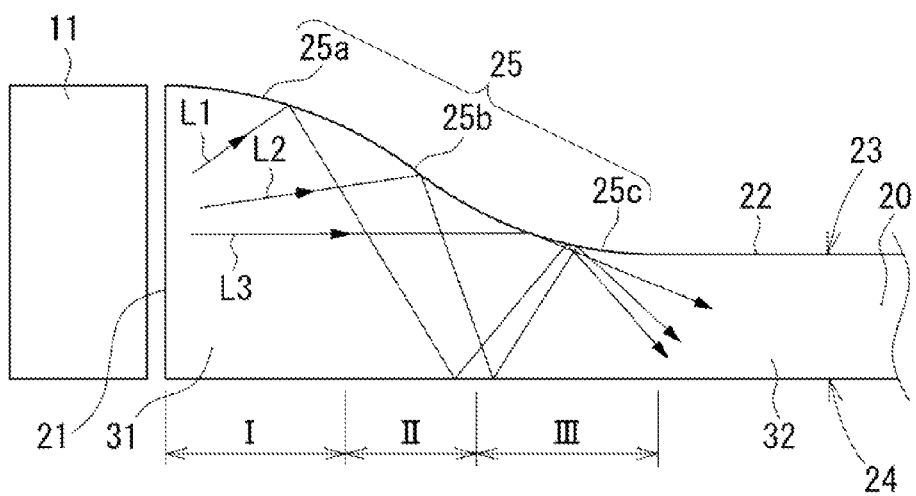

ILLUMINATION APPARATUS HAVING LIGHT GUIDE PLATE WITH CURVEDLY TAPERED LIGHT COUPLING PORTION

BACKGROUND OF THE INVENTION

1. Field of the Invention

The present invention relates to side-light type spread illuminating apparatuses including a light guide plate that has a light incident end face on which a light source is placed and that emits planar illumination light from its emitting portion.

2. Description of Related Art

As illumination units of liquid crystal display (LCD) panels, sidelight type spread illuminating apparatuses (backlights) are widely used primarily in the field of small mobile information equipment such as mobile phones. In the sidelight type spread illuminating apparatuses, a light-emitting diode (LED) having a small size and high environmental adaptability is placed along a side end face of a light guide plate. In these days, light guide plates are used in order to deal with further reduction in thickness of the small mobile information equipment. The light guide plate is a component in which a light incident wedge portion whose thickness is gradually reduced as away from the side end face having the LED placed thereon (hereinafter also referred to as the light incident surface) is formed between the light incident surface and an emitting portion. The use of such a light guide plate can reduce the thickness of the emitting portion of the light guide plate regardless of the thickness of the LED (see, e.g., Japanese Patent Application Publication Nos. 2007-287550 (JP 2007-287550 A) and 2008-170739 (JP 2008-170739 A).

In such spread illuminating apparatuses, a peripheral edge part of the emitting portion (including the light incident wedge portion and a part of the emitting portion which is located closer to the light incident wedge portion) serves as a non-light-emitting region by covering with a light shielding sheet etc. The emitting portion excluding the non-light-emitting region serves as a light-emitting portion, and light emitted from the light-emitting portion is used as illumination light.

In the case where the light guide plate has such a light incident wedge portion, a larger part of light entering the light guide plate through the light incident surface is emitted from the tilted surface of the light incident wedge portion to the outside and becomes leakage light in the non-light-emitting region. Moreover, the light that is incident on the emitting surface of the emitting portion after being reflected by the tilted surface is incident at a relatively small incident angle on a region of the emitting surface which is located closer to the light incident wedge portion. A large amount of light is therefore emitted from the part of the emitting portion which is located closer to the light incident wedge portion (normally, this light includes leakage light from the non-light-emitting region and emitted light from a part of the light-emitting region which is located closer to the light incident wedge portion). The leakage light from the non-light-emitting region reduces utilization efficiency of light emitted from the LED, and the emitted light from the part of the light-emitting region which is located closer to the light incident wedge portion reduces uniformity (evenness) of illumination light emitted from the light-emitting region. For example, JP 2007-287550 A proposes a solution to the above problem by setting the angle between the tilted surface and the emitting surface to a predetermined angle or less.

Recently, with reduction in thickness of spread illuminating apparatuses, there has been an increasing demand to reduce the size of the non-light-emitting region (i.e., to reduce the frame width) according to an increase in size of the liquid crystal display region. In order to satisfy this demand, it is necessary to reduce as much as possible the length in the light guide direction of the light incident wedge portion (the length of a tilted portion) that cannot be used as the light-emitting region.

However, in order to reduce the length in the light guide direction of the light incident wedge portion on the condition that the light incident wedge portion has a given maximum thickness (the thickness of the light incident surface, corresponding to the dimension in the lateral direction) and a given minimum thickness (corresponding to the thickness of the emitting portion), it is necessary to increase the angle between the titled surface of the light incident wedge portion and the emitting surface. However, increasing the angle between the tilted surface and the emitting surface increases the amount of light that is emitted from the tilted surface to the outside and becomes leakage light from the non-light-emitting region and the amount of light that is emitted from the part of the emitting portion which is located closer to the light incident wedge portion and becomes leakage light from the non-light-emitting region or emitted light from the part of the light-emitting region which is located closer to the light incident wedge portion. This reduces utilization efficiency of light emitted from the LED and uniformity (evenness) of illumination light emitted from the light-emitting region.

Accordingly, in such spread illuminating apparatuses including a light guide plate having a light incident wedge portion, a design idea is required which reduces the size of the non-light-emitting region as much as possible on the condition that maintains high light utilization efficiency and high uniformity of illumination light.

In relation with this, the applicant of the present invention found that the critical vale capable of reducing the length in the light guide direction of the light incident wedge portion while maintaining high light utilization efficiency and high uniformity of illumination light was approximately 1.78 times the maximum thickness of the light incident wedge portion regardless of the thickness of the emitting portion, and proposed a spread illuminating apparatus in which the length in the light guide direction of the light incident wedge portion was set to approximately 1.78 times the maximum thickness of the light incident wedge portion (see Japanese Patent Application Publication No. 2011-96522 (JP 2011-96522 A)). According to the spread illuminating apparatus described in JP 2011-96522 A, the length in the light guide direction of the light incident wedge portion can be reduced as much as possible and the size of the light-emitting region of the spread illuminating apparatus can be increased as much as possible while maintaining high light utilization efficiency and high uniformity of illumination light.

However, the demand to reduce the thickness of the LCD devices and to increase the size of their display regions is becoming increasingly strict, and it is strongly desired to further reduce the thickness and the frame width of the spread illuminating apparatuses used as a backlight of the LCD devices, while maintaining high light utilization efficiency (and high luminance of illumination light) and high uniformity of illumination light.

SUMMARY OF THE INVENTION

The present invention was developed in view of the above problem, and it is an object of the present invention to provide a spread illuminating apparatus capable of reducing the frame width and the thickness without causing reduction in luminance of illumination light, reduction in uniformity of illumination light, etc.

As a result of intensive studies to solve the above problem, the inventor obtained the knowledge that, in the light incident wedge portions of the light guide plates of the recent spread illuminating apparatuses having a reduced thickness and a reduced frame width, light leakage is more likely to occur in the region located closer to the light incident surface and the region located closer to the emitting surface than in the region located therebetween, and the risk of light leakage changes according to the distance from the light incident surface typically like a concave curve having a maximal value in the region located closer to the light incident surface and the region located closer to the emitting surface and having a minimal value in the region located therebetween. The present invention was completed based on this new knowledge.

The following aspects of the invention show the configuration of the present invention by way of example, and are individually described in order to facilitate understanding of various configurations of the present invention. Each aspect is not intended to limit the technical scope of the present invention. Part of the components of each aspect may be replaced or eliminated, or other components may be added thereto in consideration of the best mode for carrying out the invention. Such replacement, elimination, and addition are included in the technical scope of the present invention.

According to a first aspect of the present invention, a spread illuminating apparatus comprises: a light source; and a light guide plate having a light incident surface as an end face on which the light source is placed, and an emitting surface that is included in a surface connecting to one of two end sides in a longitudinal direction of the light incident surface and that emits light incident on the light incident surface, wherein the light guide plate has a light incident wedge portion including a tilted surface and having a thickness reduced from the light incident surface side toward the emitting surface side, the tilted surface has an S-shape as viewed from a side, which has a convex portion on the light incident surface side and a concave portion on the emitting surface side with an inflection point therebetween, and a distance from the light incident surface to the inflection point is larger than the thickness of the light incident surface.

In the spread illuminating apparatus according to the first aspect, the tilted surface included in the light incident wedge portion has an S-shape as viewed from the side, which has a convex portion on the light incident surface side and a concave portion on the emitting surface side with the inflection point therebetween. Accordingly, an average tilt angle of each of a region located closer to the light incident surface and a region located closer to the emitting surface in the tilt surface as viewed from the side (i.e., in a section perpendicular to the light incident surface and the emitting surface) is smaller than that in an intermediate region including the inflection point. This can effectively reduce light leakage from the region located closer to the light incident surface and the region located closer to the emitting surface in the light incident wedge portion, namely the regions of the light incident wedge portion which have a relatively high risk of light leakage, and can also reduce the amount of light that is emitted from the region of the light-emitting surface which is located closer to the light incident wedge portion.

In the spread illuminating apparatus according to the first aspect, the distance from the light incident surface to the inflection point can be made larger than the thickness of the light incident surface. This can minimize the amount of light that is emitted from the light incident wedge portion and the region of the emitting surface which is located closer to the light incident wedge portion.

According to a second aspect of the present invention, a spread illuminating apparatus comprises: a light source; and a light guide plate having a light incident surface as an end face on which the light source is placed, and an emitting surface that is included in a surface connecting to one of two end sides in a longitudinal direction of the light incident surface and that emits light incident on the light incident surface, wherein the light guide plate has a light incident wedge portion including a tilted surface and having a thickness reduced from the light incident surface side toward the emitting surface side, the tilted surface has an S-shape as viewed from a side, which has a convex portion on the light incident surface side and a concave portion on the emitting surface side with an inflection point therebetween, and the inflection point is located closer to the emitting surface than a middle position of the light incident wedge portion.

In the spread illuminating apparatus according to the second aspect, the tilted surface included in the light incident wedge portion has an S-shape as viewed from the side, which has a convex portion on the light incident surface side and a concave portion on the emitting surface side with the inflection point therebetween. In this respect, this spread illuminating apparatus has similar functions and advantageous effects to those of the spread illuminating apparatus according to the first aspect.

In the spread illuminating apparatus according to the second aspect, the inflection point is located closer to the emitting surface than the middle position of the light incident wedge portion. This can minimize the amount of light that is emitted from the light incident wedge portion and the region of the emitting surface which is located closer to the light incident wedge portion.

According to a third aspect of the present invention, a spread illuminating apparatus comprises: a light source, and a light guide plate having a light incident surface as an end face on which the light source is placed, and an emitting surface that is included in a surface connecting to one of two end sides in a longitudinal direction of the light incident surface and that emits light incident on the light incident surface, wherein the light guide plate has a light incident wedge portion including a tilted surface and having a thickness reduced from the light incident surface side toward the emitting surface side, the tilted surface has an S-shape as viewed from a side, which has a convex portion on the light incident surface side and a concave portion on the emitting surface side with an inflection point therebetween, and an area of a convex part located on the light incident surface side of the inflection point as viewed from the side is larger than that of a concave part located on the emitting surface side of the inflection point as viewed from the side.

In the spread illuminating apparatus according to the third aspect, the tilted surface included in the light incident wedge portion has an S-shape as viewed from the side, which has a convex portion on the light incident surface side and a concave portion on the emitting surface side with the inflection point therebetween. In this respect, this spread illuminating apparatus has similar functions and advantageous effects to those of the spread illuminating apparatus according to the first aspect.

In the spread illuminating apparatus according to the third aspect, the tilted surface is formed so that the area of the convex part located on the light incident surface side of the inflection point as viewed from the side is larger than that of the concave part located on the emitting surface side of the inflection point as viewed from the side. Thus, the shape of the tilted surface which has the inflection point located closer to the emitting surface than the middle position of the light incident wedge portion is implemented by an appropriate curved surface according to the risk of light leakage. This can minimize the amount of light that is emitted from the light incident wedge portion and the region of the emitting surface which is located closer to the light incident wedge portion.

In the spread illuminating apparatus according to the third aspect, the area of the convex part as viewed from the side refers to the area of such a bow-shaped region in a section perpendicular to the light incident surface and the emitting surface that is surrounded by a line segment connecting the inflection point and an end on the light incident surface side of the tilted surface and the convex portion of the tilted surface. The area of the concave part as viewed from the side refers to the area of such a bow-shaped region in the section perpendicular to the light incident surface and the emitting surface, which is surrounded by a line segment connecting the inflection point and an end on the emitting surface side of the tilted surface and the concave portion of the tilted surface. Accordingly, the convex part is a part of the light incident wedge portion, and the concave part is a part of space above the tilted surface.

In the spread illuminating apparatus according to any one of the first to third aspects, the inflection point is located in a range of 1.1 times to 1.7 times the thickness of the light incident surface from the light incident surface, both inclusive.

In the above spread illuminating apparatus, the most appropriate position of the inflection position can be set according to a practical range of a wedge ratio of the light guide plate (minimum thickness of the light incident wedge portion/maximum thickness of the light incident wedge portion).

In the spread illuminating apparatus according to any one of the above aspects, the tilted surface is provided on the emitting surface side.

In the spread illuminating apparatus according to any one of the above aspects, a sectional shape of the tilted surface which is perpendicular to the light incident surface and the emitting surface is the same at any position in the longitudinal direction of the light incident surface.

With the above configuration, the present invention can achieve reduction in frame width and reduction in thickness while maintaining high light utilization efficiency and high uniformity of illumination light in a spread illuminating apparatus including a light guide plate having a light incident wedge portion.

BRIEF DESCRIPTION OF THE DRAWINGS

FIGS. 3A, 3B, and 3C are graphs illustrating the concept of the degree of risk of light leakage according to the present invention, and schematically showing the amount of light, the incident angle, and the degree of risk of light leakage of first incident light on a tilted surface;

FIG. 4 is a diagram showing the angle of incident light on the tilted surface with the optical axis and the distance on the tilted surface corresponding to a constant angular width in order to illustrate the concept of the degree of risk of light leakage according to the present invention;

DETAILED DESCRIPTION OF THE EMBODIMENTS

Spread illuminating apparatuses according to embodiments of the present invention will be described with reference to the accompanying drawings. In each of the figures, the shape, dimensions, etc. of each component are shown exaggerated as appropriate in order to facilitate understanding of the present invention. In the case where two components are shown adjacent to each other with a space therebetween in each figure, this space is shown inserted or exaggerated in order to facilitate understanding of the present invention, and the configuration of the present invention is determined neither by the presence or absence of the space between adjacent components nor by the dimensions of the space if the space is present.

Figure 1A:
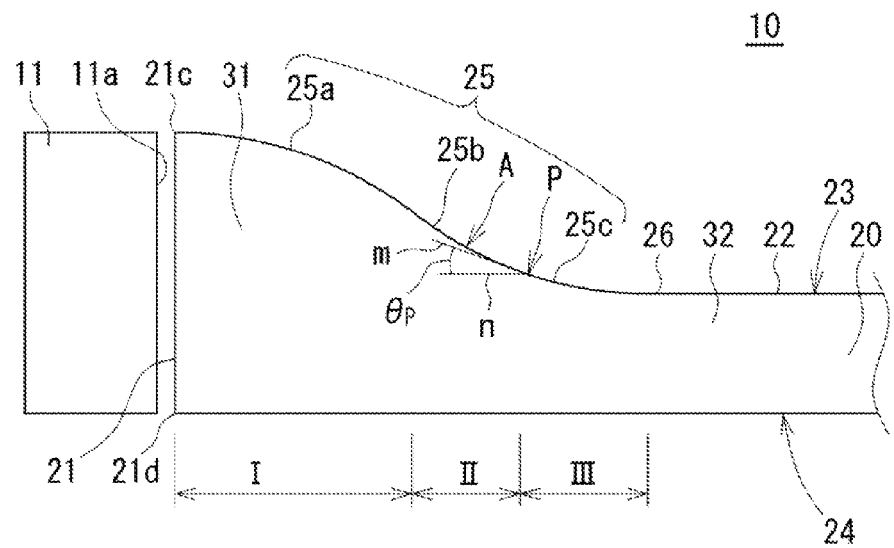
FIG. 1A is a side view showing a main part of a spread illuminating apparatus according to an embodiment of the present invention.

As shown in FIG. 1A, a spread illuminating apparatus 10 as a first embodiment of the present invention includes an LED 11 as a light source, and a light guide plate 20 that emits light emitted from the LED 11 in a planar manner. The light guide plate 20 is made of a transparent material (e.g., a polycarbonate resin) and has a rectangular shape as viewed from above. The light guide plate 20 has, on its outer surface, a light incident surface 21 as an end face on which the LED 11 is placed. In the light guide plate 20, a surface connecting to one of two sides 21c, 21d in the longitudinal direction (the direction perpendicular to the plane of the paper of FIG. 1A) of the light incident surface 21, namely the side 21c, includes an emitting surface 22 and a tilted surface 25 described below. The surface of the light guide plate 20 which includes the emitting surface 22 is sometimes hereinafter also referred to as the front surface 23, and the surface of the light guide plate 20 which faces the front surface 23 is sometimes hereinafter also referred to as the "back surface 24."

In the present invention, "forward" refers to the direction from the light incident surface 21 toward an end face (not shown) facing the light incident surface 21 (the right direction in FIG. 1A) ("rearward" refers to the opposite direction thereto). The direction "forward" thus defined is also the direction in which light having entered the light guide plate 20 through the light incident surface 21 is generally guided within the light guide plate 20, and in this sense, the front-rear direction according to this definition is sometimes referred to as the "light guide direction."

The direction in which the back surface 24 faces the front surface 23 (the upward direction in FIG. 1A) is herein defined as "upward" (the opposite direction thereto is defined as "downward"), and the up-down direction according to this definition is sometimes referred to as the "thickness direction." The direction perpendicular to the front-rear direction and the up-down direction (the direction perpendicular to the plane of the paper of FIG. 1A) is sometimes referred to as the left-right direction (when necessary, "rightward" and "leftward" are defined as viewed from the rear). The left-right direction is, in other words, the longitudinal direction of the light incident surface 21. The terms "length," "thickness," and "width" herein refer to the dimensions in the "front-rear direction," the "up-down direction," and the "left-right direction", respectively, unless otherwise specified.

The light guide plate 20 includes, from the light incident surface 21 side toward the front, a light incident wedge portion 31 including the tilted portion 25, and an emitting portion 32 including the emitting surface 22. The back surface 24 of the light guide plate 20 is formed as single flat surface along the entire length of both the light incident wedge portion 31 and the emitting portion 32. The tilted surface 25 of the light incident wedge portion 31 is formed so as to be tilted downward from the light incident surface 21 side toward the front. The thickness of the light incident wedge portion 31 is thus reduced from the light incident surface 21 side toward the emitting surface 22. The emitting surface 22 is formed as a flat surface substantially perpendicular to the light incident surface 21, and connects to a front side 26 of the tilted surface 25. The back surface 24 faces the emitting surface 22 and extends substantially parallel to the emitting surface 22.

Figure 1B:
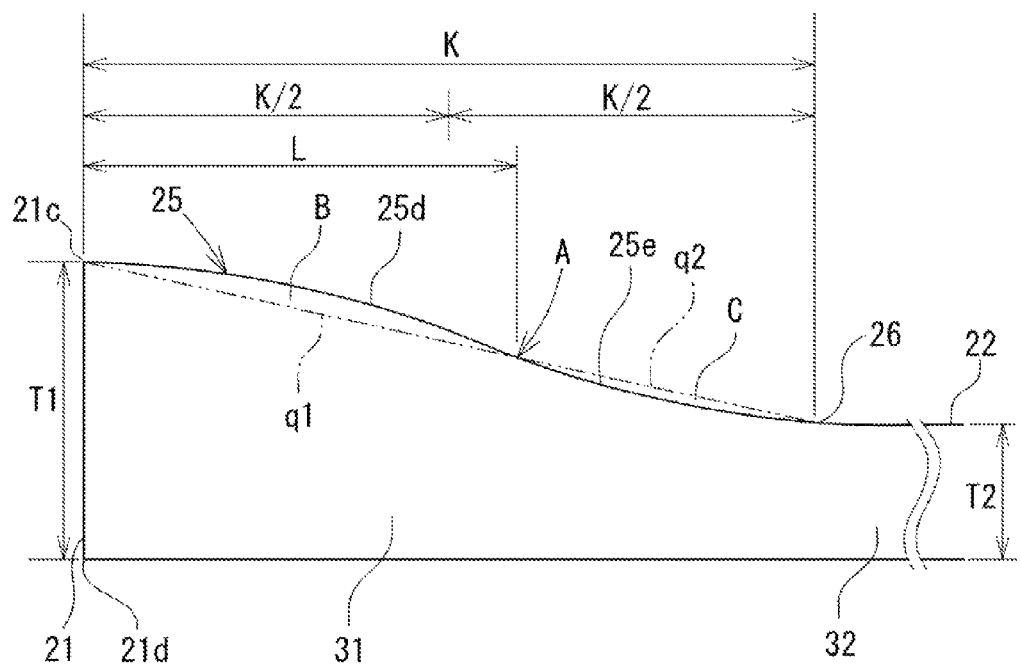
FIG. 1B is a side view showing in detail one of characteristics of the light guide plate included in the spread illuminating apparatus shown in FIG. 1A.

The configuration of the tilted surface 25 of the light incident wedge portion 31 as a main characteristic of the spread illuminating apparatus 10 will be described in detail below with reference to FIG. 1B along with FIG. 1A. FIG. 1B is a side view schematically illustrating characteristics of the light incident wedge portion 31 of the light guide plate 20 of the spread illuminating apparatus 10 shown in FIG. 1A.

In the spread illuminating apparatus 10, the section of the light incident wedge portion 31 taken along a plane perpendicular to the light incident surface 21 and the emitting surface 22 (the section taken along a plane parallel to the plane of the paper of FIG. 1A) has the same shape as the lateral shape shown in FIG. 1A at any position in the longitudinal direction of the light incident surface 21. Accordingly, in the following description, characteristics common to all such sections will be described based on the side views of FIGS. 1A and 1B.

In the present invention, a tilt angle θp of the tilted surface 25 at any position (e.g., position P) on the tilted surface 25 of the light incident wedge portion 31 is an angle formed by a half line "n" and a half line "m" in the section extending through the position P and perpendicularly to the light incident surface 21 and the emitting surface 22 (the section taken along a plane parallel to the plane of the paper of FIG. 1A; hereinafter sometimes simply referred to as the "side section") (This angle is, in other words, an angle corresponding to the upward slope at the position P on the tilted surface 25 in the side section extending through the position P). The half line "n" extends parallel to the emitting surface 22 from the position P toward the light incident surface 21, and the half line "m" extends from the position P toward the light incident surface 21 and is tangent to the tilted surface 25.

In the light guide plate 20, the tilted surface 25 is generally formed as a single continuous curved surface. This continuous curved surface has a generally S-shape as viewed from the side. Namely, this continuous curved surface extends toward the back surface 24 as it gets farther from the light incident surface 21 and closer to the front, and is formed as a convex curved surface on the light incident surface 21 side and as a concave curved surface on the emitting surface 22 side. The inflection point A of the S-shape of the tilted surface 25 as viewed from the side is the boundary between a convex portion 25d on the light incident surface 21 side and a concave portion 25e on the emitting surface 22 side (see FIG. 1B).

The spread illuminating apparatus 10 is designed so that the distance L in the light guide direction from the light incident surface 21 to the inflection point A (hereinafter sometimes simply referred to as the "distance"), as shown in FIG. 1B, is larger than the thickness T1 of the light incident surface 21. In the spread illuminating apparatus 10, the position of the inflection point A (the distance from the light incident surface 21) is in the range of 1.1 times to 1.7 times the thickness T1 of the light incident surface 21, both inclusive. The spread illuminating apparatus 10 is also designed so that the inflection point A is located closer to the emitting surface 22 than a middle position of the light incident wedge portion 31 in the light guide direction. In other words, the distance L from the light incident surface 21 to the inflection point A is larger than half the length K of the light incident wedge portion 31 (K/2).

In the case where the tilted surface 25 is formed by an appropriate curved surface having an S-shape as viewed from the side according to the degree of risk of light leakage described below, designing the spread illuminating apparatus 10 so that the inflection point A is located closer to the emitting surface 22 than the middle position of the light incident wedge portion 31 in the light guide direction corresponds to forming the shape of the tilted surface 25 so that the area of a convex part on the light incident surface 21 side of the inflection point A as viewed from the side is larger than that of a concave part on the emitting surface 22 side of the inflection point A as viewed from the side.

The area of the convex part as viewed from the side is the area of a bow-shaped region B in the side section of the tilted surface 25, which is surrounded by a line segment q1 connecting the inflection point A and the end on the light incident surface 21 side of the tilted surface 25 (in this case, the side 21c of the light incident surface 21) and the convex portion 25d of the tilted surface 25. The area of the concave part as viewed from the side is the area of a bow-shaped region C in the side section of the tilted surface 25, which is surrounded by a line segment q2 connecting the inflection point A and the end on the emitting surface 22 side of the tilted surface 25 (in this case, the front side 26 of the tilted surface 25) and the concave portion 25*e* of the tilted surface 25. Accordingly, the convex part is a part of the light incident wedge portion 31, and the concave part is a part of the space above the tilted surface 25.

The area of the convex part as viewed from the side (the area of the bow-shaped region B) and the area of the concave part as viewed from the side (the area of the bow-shaped region C) are hereinafter sometimes referred to as the area of the convex part B and the area of the concave part C, respectively.

The two line segments q1, q2 are shown as a continuous straight line in FIG. 1B. However, the shape of the tilted surface 25 according to the present invention is not limited to this shape, and includes such a shape that the inflection point A is not located on a line segment connecting the end on the light incident surface 21 side of the tilted surface 25 and the end on the emitting surface 22 side of the tilted surface 25 (the inflection point A is located above or below this line segment).

In the spread illuminating apparatus 10, the tilted surface 25 is formed as a continuous curved surface. The tilt angle of the tilted surface 25 therefore spatially continuously varies in the front-rear direction in any side section. In this case, the tilted surface 25 has an S-shape as viewed from the side, which has a convex portion on the light incident surface 21 side (rear side) and a concave portion on the emitting surface 22 side (front side) with the inflection point A therebetween. The tilt angle of the tilted surface 25 therefore has the following characteristics.

The tilted surface 25 is divided into a first tilted surface portion 25*a* (a range shown by "I" in FIG. 1A), a second tilted surface portion 25*b* (a range shown by "II" in FIG. 1A), and a third tilted surface portion 25*c* (a range shown by "III" in FIG. 1A) sequentially from the light incident surface 21 side. Specifically, the second tilted surface portion 25*b* corresponds to a range of the tilted surface 25 which includes the inflection point A and extends forward and rearward from the inflection point A. The second tilted surface portion 25*b* thus includes a part of the convex portion 25*d* which extends rearward from the inflection point A, and a part of the concave portion 25*e* which extends forward from the inflection point A. The first tilted surface portion 25*a* corresponds to the remaining part of the convex portion 25*d* of the tilted surface 25 which is located rearward of the second tilted surface portion 25*b*. The third tilted surface portion 25*c* is the remaining part of the concave portion 25*e* of the tilted surface 25 which is located forward of the second tilted surface portion 25*b*.

Figure 2:
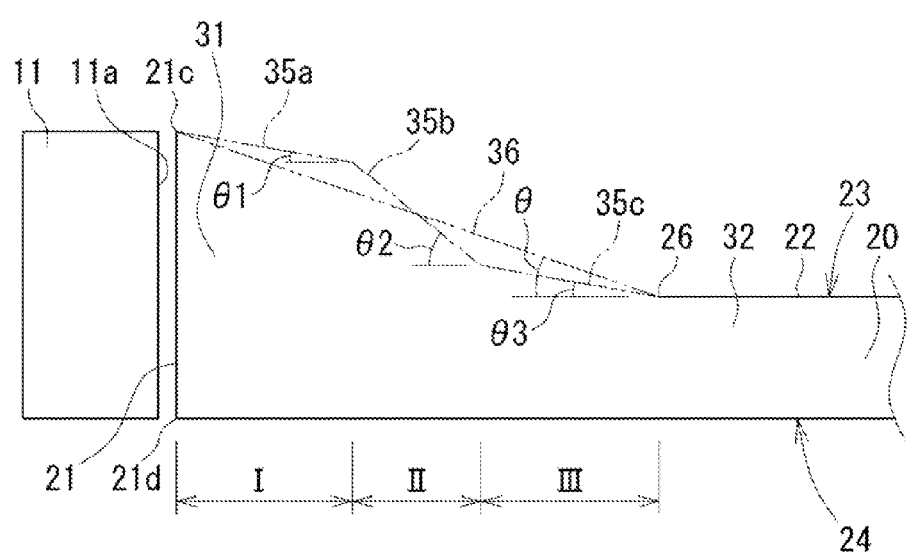
FIG. 2 is a side view schematically showing one of the characteristics of the light guide plate included in the spread illuminating apparatus according to the embodiment of the present invention.

FIG. 2 schematically shows an example of respective average tilt angles $\theta1$, $\theta2$, $\theta3$ of the first, second, and third tilted surface portions 25*a*, 25*b*, 25*c* and an average tilt angle $\theta$ of the tilted surface 25 along the entire length of the light incident wedge portion 31, and also shows imaginary flat surfaces 35*a*, 35*b*, 35*c*, 36 having the average tilt angles $\theta1$, $\theta2$, $\theta3$, $\theta$ as their respective tilt angles. In FIG. 2, the imaginary flat surface 36 corresponds to the tilted surface shape of a typical light incident wedge portion in the conventional spread illuminating apparatus. An average tilt angle in a specific range of the tilted surface 25 is an angle obtained by averaging the tilt angles at each position in the entire specific range.

In the spread illuminating apparatus 10, the first tilted surface portion 25*a*, the second tilted surface portion 25*b*, and the third tilted surface portion 25*c* are formed so that the average tilt angle $\theta2$ of the second tilted surface portion 25*b* is larger than the average tilt angle $\theta1$ of the first tilted surface portion 25*a* and the average tilt angle $\theta3$ of the third tilted surface portion 25*c*, due to the curved surface shape of the tilted surface 25. The average tilt angles $\theta1$, $\theta3$ of the first and third tilted surface portions 25*a*, 25*c* are smaller than the average tilt angle $\theta$ of the tilted surface 25 along the entire length of the light incident wedge portion 31.

Characteristics of the spread illuminating apparatus 10 will be described in detail together with their functions and advantageous effects with reference to FIGS. 3A to 9.

First, in a conventional spread illuminating apparatus in which a tilted surface of a light incident wedge portion is formed as a tilted surface having a single tilt angle $\theta$ like the imaginary flat surface 36 shown in FIG. 2, properties of leakage light from the tilted surface, especially dependence of the risk of light leakage on the position on the tilted surface, will be described based on the concept of the degree of risk of light leakage described below.

In the following description, for convenience, the tilted surface of the conventional spread illuminating apparatus is denoted by the reference character "36," and other components of the conventional spread illuminating apparatus are denoted by the same reference characters as those of the spread illuminating apparatus 10.

The amount of light that leaks from the light incident wedge portion 31 and from the emitting surface 22 in the vicinity of the light incident wedge portion 31 due to the tilted surface 36, relative to the incident light on the tilted surface 36 (hereinafter this amount is referred to as the "degree of risk of light leakage" or simply as the "degree of risk") is dependent on the amount of light (light amount) that is incident on the tilted surface 36 and an angle of light that is incident on the tilted surface 36 with the optical axis (in the present invention, this angle is referred to as the "incident angle"), as given by the following expression.

"Light amount"×"Incident angle"="Degree of risk of light leakage"

In the present invention, the term "optical axis" refers to the central axis extending from the center of a light-emitting surface 11*a* of the LED 11 perpendicularly to the light-emitting surface 11*a* (and thus the light incident surface 21).

The reason why the degree of risk of light leakage is dependent on the incident angle is that transmittance of light that is transmitted from the inside of the light guide plate 20 to the outside thereof through the tilted surface 36 is dependent on the incident angle. The light amount and the incident angle are dependent on the distance from the light-emitting surface 11*a* of the LED 11 (substantially the same as the light incident surface 21 of the light guide plate 20) in the optical axis direction.

In the light guide plate 20 of the recent spread illuminating apparatuses with a reduced thickness and a reduced frame width, light that is incident on the tilted surface 36 mainly includes first incident light and second incident light as described below. The first incident light is the light that is incident on the tilted surface 36 for the first time after entering the light guide plate 20 through the light incident surface 21. The second incident light is the light that is reflected by the back surface 24 and incident on the tilted surface 36 for the first time after entering the light guide plate 20 through the light incident surface 21, and the first incident light that is incident again on the tilted surface 36 after being reflected by the tilted surface 36 and then by the back surface 24. There is also light that is incident again on the tilted surface 36 after being reflected twice or more by the back surface 24. However, the amount of such light is smaller than the amount of the first incident light and the amount of the second incident light, and the proportion of such light to the leakage light is small.

FIGS. 3A, 3B, and 3C are graphs regarding the first incident light, and show the distributions of the amount of light that is incident on the tilted surface 36, the incident angle, and the degree of risk with respect to the distance from the LED 11 in the optical axis direction, respectively. FIGS. 3A, 3B, and 3C schematically illustrate characteristics of the degree of risk in a simple manner.

First, the amount of light will be described. Light emitted in a generally radial fashion from the LED 11 and entering the light guide plate 20 has such light distribution that the amount of light is the largest in the optical axis direction and decreases as the angle with the optical axis increases. As shown in FIG. 4, the width of the titled surface 36 which corresponds to the unit angle from the center of the light-emitting surface 11a of the LED 11 as the origin (this width corresponds to the width D in the optical axis direction) increases as the angle of the light beam with the optical axis decreases, and decreases as the angle of the light beam with the optical axis increases (D1<D2<D3). As shown in FIG. 3A, in a region close to the light incident surface 21, the amount of incident light on the tilted surface 36 per unit distance (unit area) increases as the distance from the LED 11 increases. However, after reaching its peak (maximal region), the amount of incident light on the tilted surface 36 per unit distance (unit area) starts to decrease as the distance from the LED 11 increases.

Next, the incident angle will be described. As shown in FIG. 3B, the incident angle of the light that is incident on the tilted surface 36 has a variation (range) according to the distance from the LED 11. The upper limit of this range decreases the distance from the LED 11 increases. The light transmittance at the tilted surface 36 therefore decreases as the distance from the LED 11 increases.

Accordingly, as shown in FIG. 3C, the degree of risk of light leakage (the light amount multiplied by the upper limit of the incident angle) reaches its maximum value when the distance from the LED 11 is close to zero. In the region located forward of this position, the degree of risk of light leakage decreases as the distance from the LED 11 increases.

Figure 5A:
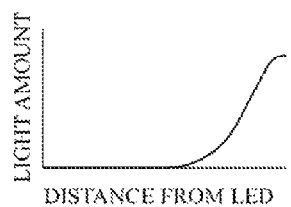
FIGS. 5A, 5B, and 5C are graphs illustrating the concept of the degree of risk of light leakage according to the present invention, and schematically showing the amount of light, the incident angle, and the degree of risk of light leakage of second incident light on the tilted surface.
Figure 5B:
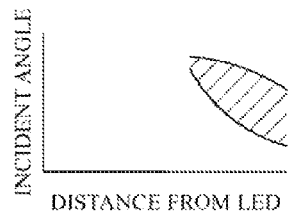
Figure 5C:
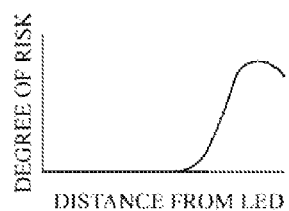

Next, the second incident light will be described with reference to FIGS. 5A to 5C. FIGS. 5A, 5B, and 5C are graphs regarding the second incident light, and show the distributions of the amount of light that is incident on the tilted surface 36, the incident angle, and the degree of risk with respect to the distance from the LED 11 in the optical axis direction, respectively. FIGS. 5A, 5B, and 5C schematically illustrate characteristics of the degree of risk in a simple manner.

First, the amount of light will be described. As shown in FIG. 5A, the distribution of the amount of the second incident light has a peak (maximal region) at a position located forward of the peak position of the first incident light. Next, the incident angle of the second incident light will be described with reference to FIG. 5B. The second incident light includes the light whose incident angle changes upon the first reflection at the tilted surface 36 (the incident angle is increased to about twice the tilt angle θ of the tilted surface 36). Accordingly, the upper limit of the incident angle has a distribution obtained by shifting the distribution of the first incident light forward and reflecting the change in angle upon the first reflection on this shifted distribution. The lower limit of the incident angle has a positive value corresponding to the distance from the LED 11. Like the upper limit, the lower limit of the incident angle tends to decrease as the distance from the LED 11 increases.

As shown in FIG. 5C, the risk of light leakage of the second incident light therefore basically has a distribution obtained by shifting the distribution of the degree of risk of light leakage of the first incident light forward. The degree of risk of light leakage of the second incident light can be higher than that of risk of light leakage of the first incident light depending on the amount of change in angle upon the first reflection at the tilted surface 36.

Figure 6:
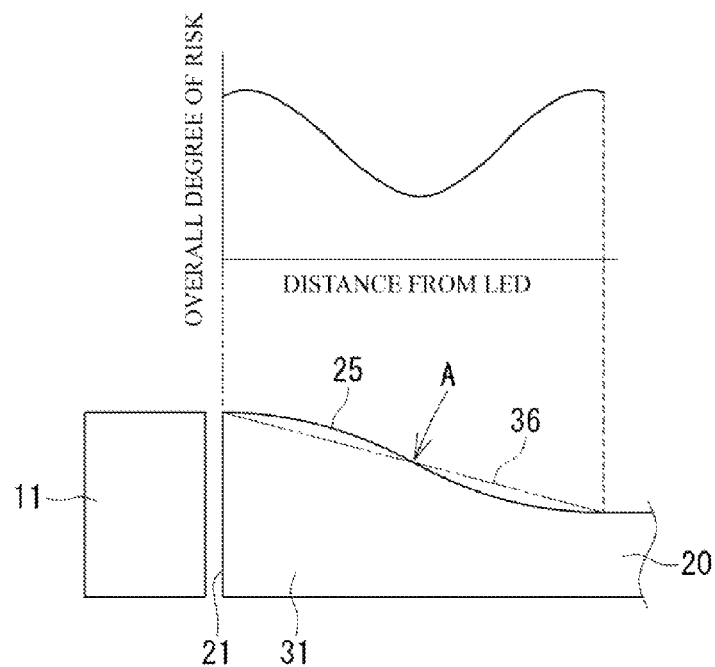
FIG. 6 is a diagram showing distribution of the overall degree of risk of light leakage corresponding to the shape of a light incident wedge portion.
Figure 7:
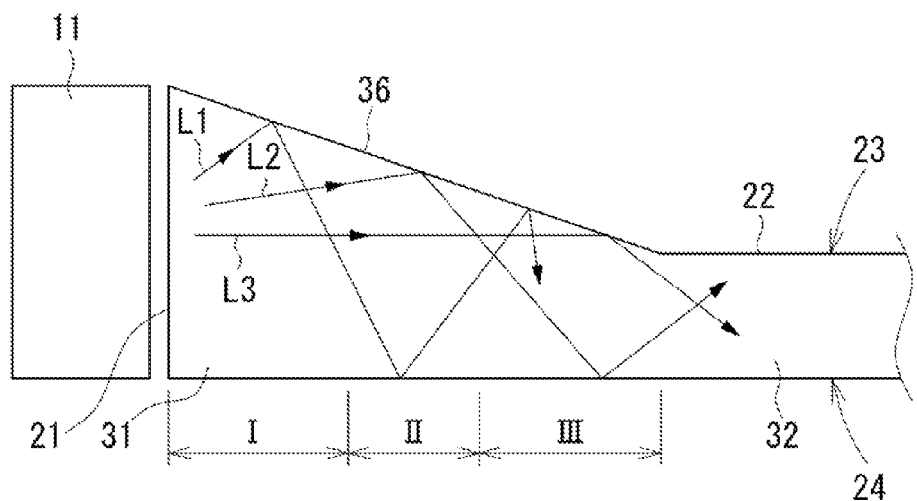
FIG. 7A is a side view showing a conventional spread illuminating apparatus and light paths of a plurality of incident light beams having different incident angles.
FIG. 7B is a side view showing the spread illuminating apparatus shown in FIG. 1A and light paths of a plurality of incident light beams having different incident angles.

The sum of the degree of risk of light leakage of the first incident light and the degree of risk of light leakage of the second incident light thus obtained is the overall degree of risk of light leakage at the tilted surface (see FIG. 6). As shown in FIG. 6, there is a portion having a high degree of risk of light leakage (a portion having a maximal value) at a position located at a small distance from the LED 11 (a position close to the light incident surface 21). The degree of risk of light leakage gradually decreases as the distance from the LED 11 increases from this position. As the distance from the LED 11 further increases, the degree of risk of light leakage starts to increase gradually and reaches a maximal value again. The distribution of the overall degree of risk of light leakage therefore has a concave curve that is recessed downward in the middle. As described below, however, a minimal value (in this case, a minimum value) of the degree of risk of light leakage does not necessarily appear at the exact middle position in the light guide direction of the light incident wedge portion 31.

As described above, one of the characteristics of the present invention is that the tilted surface 25 included in the light incident wedge portion 31 has an S-shape as viewed from the side, which has a convex portion on the light incident surface 21 side and a concave portion on the emitting surface 22 side with the inflection point A therebetween, based on the knowledge that the overall degree of risk of light leakage is divided into two regions including the maximal value (a maximal region on the light incident surface 21 side and a maximal region on the emitting surface 22 side) and one region including the minimal value (a minimal region in the middle).

Thus, the first tilted surface portion 25a and the third tilted surface portion 25c are provided in the ranges corresponding to the maximal regions on the light incident surface 21 side and on the emitting surface 22 side on the tilted surface 25 of the light incident wedge portion 31, respectively, and the second tilted surface portion 25b is provided in the range corresponding to the minimal region in the middle on the tilted surface 25 of the light incident wedge portion 31. The configuration is thus implemented in which the average tilt angles θ1, θ3 of the first and third tilted surface portions 25a, 25c are relatively smaller than the average tilt angle θ2 of the second tilted surface portion 25b. This configuration can effectively reduce leakage light that is generated at the tilted surface 25.

Luminance of illumination light that is emitted from a light-emitting region of the emitting surface 22 can thus be improved in the spread illuminating apparatus 10.

The configuration of the spread illuminating apparatus 10 in which the tilted surface 25 has an S-shape as viewed from the side, which has a convex portion on the light incident surface 21 side and a concave portion on the emitting surface 22 side with the inflection point A therebetween is advantageous for implementing an optimal tilted surface shape for reducing leakage light from the tilted surface 25 according to the distribution of the overall degree of risk of light leakage.

As shown in FIG. 7A, in a conventional spread illuminating apparatus including the tilted surface 36 having a constant tilt angle along the entire length of the light incident wedge portion 31, light L1 emitted from the LED 11 in a direction having a large angle with the optical axis and thus incident on a region (I) closer to the light incident surface 21 on the tilted surface 36 at a relatively large incident angle is incident on a region (III) closer to the emitting surface 22 on the tilted surface 36 as the second incident light, which presents a high risk of light leakage. Moreover, depending on the conditions, reflected light components of this incident light may be repeatedly reflected between the tilted surface 36 and the back surface 24 and tend to be emitted from the emitting surface 22 in the vicinity of the light incident wedge portion 31. In such a conventional spread illuminating apparatus, uniformity of illumination light that is emitted from the light-emitting region of the emitting surface 22 is degraded by such leakage light.

On the other hand, in the spread illuminating apparatus 10 of the present embodiment, the average tilt angles θ1, θ3 of the first and third tilted surface portions 25a, 25c are relatively reduced. As shown in FIG. 7B, this allows even the light (also denoted by "L1") that is incident on the tilted surface 25 under conditions similar to those of the light L1 to be guided in the emitting portion 32 without being emitted from the emitting surface 22 in the vicinity of the light incident wedge portion 31.

Thus, uniformity of illumination light that is emitted from the light-emitting region of the emitting surface 22 can also be improved in the spread illuminating apparatus 10.

Figure 8:
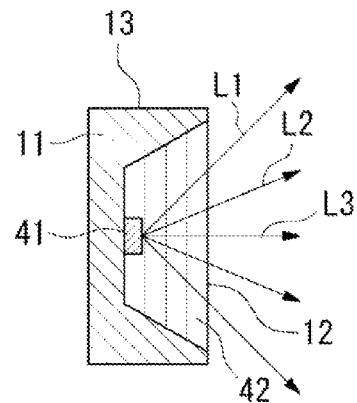
FIG. 8 is a sectional view showing a typical configuration of a pseudo white LED.

In the case where the LED 11 is a so-called pseudo white LED, this characteristic of the spread illuminating apparatus 10 has the following advantageous effect. As shown in FIG. 8, pseudo white LEDs typically include a blue light-emitting chip 41 sealed by a transparent resin 42 having a yellow fluorescent material dispersed therein, and implement a light emission spectrum that looks white by mixture of blue light emitted from the blue light-emitting chip 41 and yellow light emitted from the yellow fluorescent material having absorbed the blue light.

In this case, light L1 that is emitted from the LED 11 in a direction having a large angle with its optical axis travels for a longer distance within the transparent resin 42 than light L2 and light L3 that are emitted from the LED 11 in directions having smaller angles with its optical axis. The light L1 therefore tends to become yellowish white light. As described above with reference to FIG. 7A, the light L1 that is incident at a relatively large incident angle on the region (I) closer to the light incident surface 21 on the tilted surface 36 tends to be emitted from the emitting surface 22 in the vicinity of the light incident wedge portion 31. Accordingly, this emitted light is also a cause of the problem that the illumination light emitted from the light-emitting region in the vicinity of the light incident wedge portion 31 is yellowish.

In the spread illuminating apparatus 10, light that is incident on the tilted surface 25 under such conditions as those of the light L1 can be guided in the emitting portion 32 without being emitted from the emitting surface 22 in the vicinity of the light incident wedge portion 31. This eliminates or suppresses color unevenness that is visually recognized as light emitted from the portion of the light-emitting region which is located closer to the light incident wedge portion 31 is more yellowish as compared to light emitted from the remaining portion of the light-emitting region. Accordingly, chromaticity distribution of illumination light can be improved.

Moreover, in the spread illuminating apparatus 10, the average tilt angle θ3 of the third tilted surface portion 25c as a portion of the tilted surface 25 which connects to the emitting surface 22 is smaller than the constant tilt angle θ of the conventional tilted surface 36. This can suppress uneven luminance (abrupt change in luminance) that is caused by discontinuous connection between the tilted surface 25 and the emitting surface 22 at a constant intersecting angle. This effect of suppressing uneven luminance becomes more significant because the tilted surface 25 of the spread illuminating apparatus 10 has a concave shape in the third tilted surface portion 25c and the tilt angle of the portion connecting to the emitting surface 22 is smaller than the average tilt angle θ3.

In the spread illuminating apparatus 10, the average tilt angle θ1 of the first tilted surface portion 25a as a portion of the tilted surface 25 which is located closer to the light incident surface 21 is smaller than the constant tilt angle θ of the conventional tilted surface 36. This can reduce problems with mounting of the LED 11, such as that the light-emitting surface 11a of the LED 11 is tilted with respect to the light incident surface 21 of the light guide plate 20, in the case where a flexible printed circuit board (FPC) (not shown) having the LED 11 mounted thereon is fixed directly to the tilted surface 25 of the light guide plate 20.

The second tilted surface portion 25b having the largest average tilt angle out of the three tilted surface portions is located in the middle of the light incident wedge portion 31 in the light guide direction. Accordingly, even if light leaks from the second tilted surface portion 25b, the leakage light can be reliably absorbed by a light shielding member that is usually placed above the tilted surface 25.

The characteristics, and functions and advantageous effects of the present invention will be described in terms of minimizing light leakage from the tilted surface 25 and the emitting surface 22 in the vicinity of the tilted surface 25.

In order to minimize such light leakage in the spread illuminating apparatus 10, it is important to design the shape of the tilted surface 25 so that the first tilted surface portion 25a and the third tilted surface portion 25c are, respectively, appropriately located in the ranges corresponding to the maximal regions of the degree of risk of light leakage on the light incident surface 21 side and the emitting surface 22 side, and the second tilted surface portion 25b is appropriately located in range corresponding to the minimal region of the degree of risk of light leakage on the tilted surface 25, according to the distribution of the degree of risk of light leakage on the tilted surface 25. In the spread illuminating apparatus 10, the tilted surface 25 has an S-shape as viewed from the side, which has the convex portion on the light incident surface 21 side and the concave portion on the emitting surface 22 side with the inflection point A therebetween. Such appropriate arrangement of the first, second, and third tilted surface portions 25a, 25b, 25c can be implemented by optimizing the distance in the light guide direction from the light incident surface 21 to the inflection point A.

The distance from the light incident surface 21 in the light guide direction (in this case, the distance from the light-emitting surface 11a of the LED 11 in the optical axis direction) is herein also referred to as the "distance from the light incident surface 21" or simply as the "distance" unless otherwise specified.

The inventor of the present invention looked at the fact that the distance from the light incident surface 21 to the inflection point A of the S-shape of the tilted surface 25 is an important condition for minimizing light leakage from the tilted surface 25 and the emitting surface 22 in the vicinity of the tilted surface 25. The inventor thus completed the present invention by finding the method for easily and accurately determining an optimal distance from the light incident surface 21 to the inflection point A so as to minimize such light leakage.

In view of the description of the degree of risk of light leakage which is provided above with reference to FIGS. 3A to 6, the optimal distance to the inflection point A (i.e., the point at which the tilted surface 25 has the maximum tilt angle θp) is the distance that minimizes the degree of risk of light leakage of the tilted surface 25. The inventor therefore derived, in the following manner, an expression of approximately obtaining the distance that minimizes the degree of risk of light leakage of the tilted surface 25, based on data on the dimensions and the refractive index of the light guide plate 20.

The distribution of the overall degree of risk of light leakage shown in FIG. 6 is obtained by the sum of the degree of risk of light leakage of the first incident light shown in FIG. 3C and the degree of risk of light leakage of the second incident light shown in FIG. 5C. Accordingly, the distance that minimizes the degree of risk of light leakage is substantially the same as the distance at which the second incident light starts to appear, as viewed in the light guide direction from the light incident surface 21 side.

Figure 9:
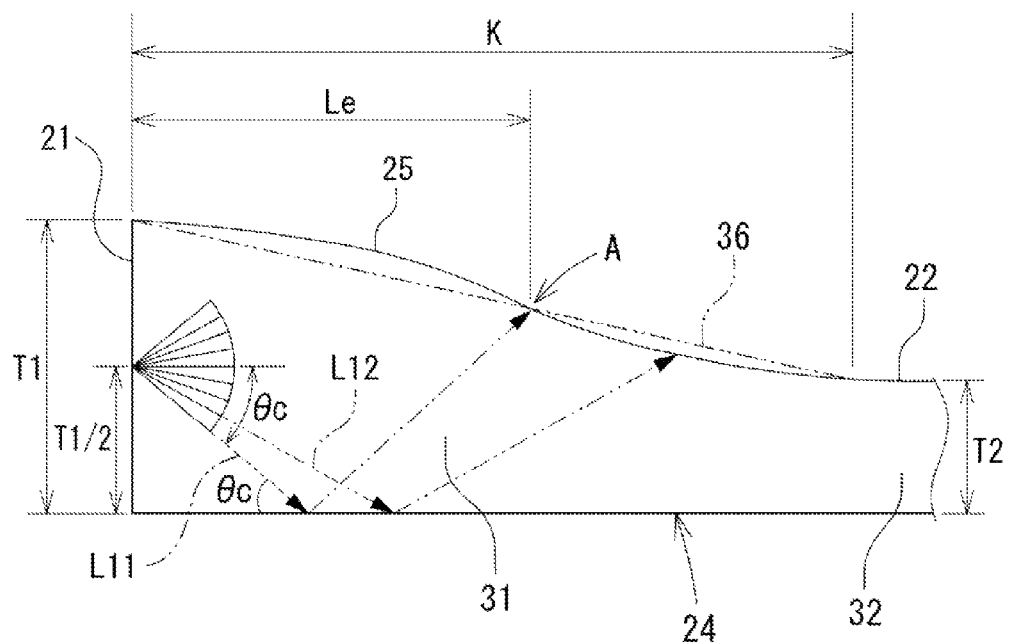
FIG. 9 is a diagram illustrating an expression for obtaining the position where the degree of risk of light leakage is the lowest in the spread illuminating apparatus according to the embodiment.

Moreover, the distance at which the second incident light starts to appear is substantially the same as the distance at which, as shown in FIG. 9, light L11 emitted from the LED 11 and entering the light guide plate 20 through the light incident surface 21 in the direction toward the back surface 24 at a refraction angle equal to a critical angle θc is incident on the tilted surface 25 after being reflected by the back surface 24.

This is because the critical angle θc is the upper limit of the refraction angle of the light entering the light guide plate 20 from air and light L12 entering the light guide plate 20 in the direction toward the back surface 24 at a refraction angle smaller than the critical angle θc is guided to a position farther from the light incident surface 21 than the light L11 is after being reflected by the back surface 24, as shown in FIG. 9. Although not shown in the figures, of the second incident light, the light that is first reflected by the tilted surface 25 and then reflected by the back surface 24 is also usually guided to a position farther from the light incident surface 21 than the light L11 is.

Based on the above description, the distance Le that minimizes the degree of risk of light leakage can be approximately given by the following expression that represents the distance at which the light L11 is incident on the tilted surface 25.

$$Le \approx \frac{3\alpha T1^2}{2(T1-T2) + 2\alpha T1 \tan\left(\sin^{-1}\frac{1}{n}\right)}$$

"T1" represents the maximum thickness of the light incident wedge portion 31 (the thickness of the light incident surface 21), "T2" represents the minimum thickness of the light incident wedge portion 31 (the thickness of the emitting portion 32), "α" represents the ratio (K/T1) of the length K of the light incident wedge portion 31 to the maximum thickness T1 of the light incident wedge portion 31, and "n" represents the refractive index of a resin material forming the light guide plate 20. The critical angle θc is θc=sin⁻¹(1/n).

When deriving the above expression, the LED 11 was an ideal point light source placed at a middle position in the thickness direction of the light incident surface 21 (the distance in the thickness direction from the back surface 24 is T1/2), and the tilted surface 25 was approximated as the imaginary flat surface 36 for which the maximum thickness T1, the minimum thickness T2, and the length K of the light incident wedge portion 31 were the same as those of the light incident wedge portion 31 for the tilted surface 25.

In order to verify if the distance Le minimizing the degree of risk of light leakage, which is obtained by the above expression, is effective as the optimal distance to the inflection point A to minimize light leakage from the tilted surface 25 and the emitting surface 22 in the vicinity of the tilted surface 25, the distance Le was compared to the distance to the inflection point A which was obtained by more realistic simulation. The simulation was conducted by realistically modeling the shape of the light-emitting surface 11a (specifically, an open window formed in a lamp house) of the LED 11, designing the S-shape of the tilted surface 25 so as to minimize light leakage from the tilted surface 25 and the emitting surface 22 in the vicinity of the tilted surface 25, and obtaining the distance L2 to the inflection point A by the S-shape.

In each case, the light guide plate 20 was molded from polycarbonate (n=1.58) that is the most typical example of an optical resin material, and α=K/T1 was 1.78. α=1.78 was used because the applicant of the present invention proposed the condition that the critical value capable of reducing the length K in the light guide direction of the light incident wedge portion 31 while maintaining high utilization efficiency of emitted light from the LED 11 and high uniformity of illumination light was approximately 1.78 times the maximum thickness T1 of the light incident wedge portion 31 (Japanese Patent Application Publication No. 2011-96522 (JP 2011-96522 A)), and used this condition in the spread illuminating apparatus 10.

The comparison result is as follows. In the case where the maximum thickness T1 of the light incident wedge portion 31 was 0.58 mm and the minimum thickness T2 thereof was 0.4 mm, the distance Le obtained by the above expression was 0.89 mm, whereas the distance L2 obtained by the simulation was 0.9 mm. In the case where the maximum thickness T1 of the light incident wedge portion 31 was 0.40 mm and the minimum thickness T2 thereof was 0.28 mm, the distance Le obtained by the above expression was 0.61 mm, whereas the distance L2 obtained by the simulation was 0.6 mm. The distance Le obtained by the above expression thus closely matches the distance L2 obtained by the simulation. From this result, it was verified that the distance Le obtained by the above expression can be effectively used as the distance to the inflection point A in the S-shape which minimizes light leakage from the tilted surface 25 and the emitting surface 22 in the vicinity of the tilted surface 25.

The condition that the inflection point A should be satisfied in order to minimize light leakage from the tilted surface 25 and the emitting surface 22 in the vicinity of the tilted surface 25 will be described based on the above result.

In the following description, the wedge ratio is the ratio (T2/T1) of the minimum thickness T2 of the light incident wedge portion 31 to the maximum thickness T1 of the light incident wedge portion 31 of the light guide plate 20, and the normalized distance is the distance Le (the distance obtained by the above expression) normalized by the thickness (in this case, T1) of the light incident surface 21 ($L_N$=Le/T1).

Figure 10A:
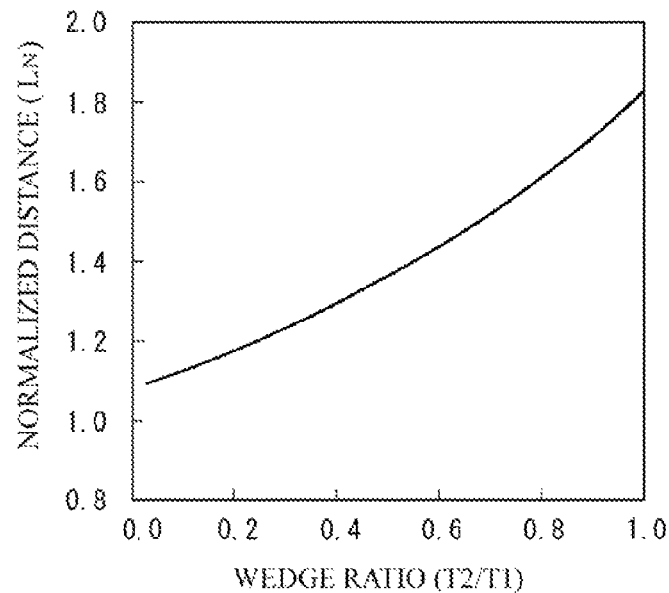
FIG. 10A is a graph showing the relation between the normalized distance and the wedge ratio.
Figure 10B:
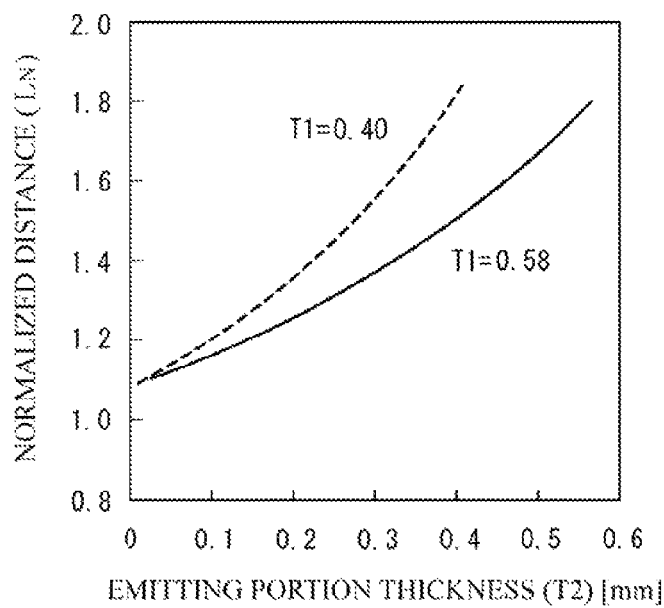
FIG. 10B is a graph showing the relation between the normalized distance and the thickness of the emitting portion.

FIG. 10A is a graph showing the relation between the wedge ratio and the normalized distance, and FIG. 10B is a graph showing the relation between the thickness (T2) of the emitting portion 32 and the normalized distance. Each graph shows the case where n=1.58 and α=1.78.

As shown in FIG. 10A, the normalized distance $L_N$ is larger than 1.0 in the entire theoretical range of the wedge ratio (0<(T2/T1)<1). This means that the distance Le is larger than the thickness T1 of the light incident surface 21. This shows that, in order to minimize light leakage from the tilted surface 25 and the emitting surface 22 in the vicinity of the tilted surface 25 in the spread illuminating apparatus 10, the distance L in the light guide direction from the light incident surface 21 to the inflection point A (see FIG. 1B) needs to be set to a value larger than the thickness T1 of the light incident surface 21 (L>T1).

In the practical range of the wedge ratio (0.1<(T2/T1) <0.9), the distance L in the light guide direction from the light incident surface 21 to the inflection point A needs to be set to a value in the range of 1.1 times to 1.7 times the thickness T1 of the light incident surface 21, both inclusive. An optimal value of the distance L in this range is determined according to the wedge ratio of the light guide plate 20. For example, in the case where the wedge ratio of the light guide plate 20 is represented as a value close to 0.55, the distance L is generally desirably about 1.4 times the thickness T1 of the light incident surface 21.

It can be seen from FIG. 10B that in the case where the thickness T1 of the light incident surface 21 is 0.58 mm and the thickness T2 of the emitting portion 32 is 0.4 mm as a typical example, it is desirable to set the distance L to about 1.5 times the thickness T1 of the light incident surface 21. Moreover, in the case where the thickness T1 of the light incident surface 21 is 0.4 mm and the thickness T2 of the emitting portion 32 is 0.25 mm, it is desirable to set the distance L to about 1.45 times the thickness T1 of the light incident surface 21. As used herein, the acceptable range defined by the term "about" is ±0.2 times.

The graph shown in FIG. 10A shows the case where α=1.78. Since the length K of the light incident wedge portion 31 (see FIG. 1) is 1.78 times the maximum thickness (thickness of the light incident surface 21) T1 of the light incident wedge portion 31 (K=1.78×T1), the distance L being larger than the thickness T1 of the light incident surface 21 (L>T1) means that the distance L is larger than half the length K of the light incident wedge portion 31 (K/2=0.89×T1). In this sense, the inflection point A is located closer to the emitting surface 22 (closer to the front) than the middle position of the light incident wedge portion 31. Accordingly, if the condition that the distance L in the light guide direction from the light incident surface 21 to the inflection point A is larger than the thickness T1 of the light incident surface 21 is satisfied as the condition for minimizing light leakage from the tilted surface 25 and the emitting surface 22 in the vicinity of the tilted surface 25, the inflection point A is located closer to the emitting surface 22 than the middle position of the light incident wedge portion 31.

There may be a case where the distance L is not larger than the thickness T1 of the light incident surface 21 even if the condition that the distance L in the light guide direction from the light incident surface 21 to the inflection point A is larger than half the length K of the light incident wedge portion 31 (K/2=0.89×T1) is satisfied as in the case of, e.g., L=0.95×T1. In such a case, however, the distance L has a value close to the thickness T1 of the light incident surface 21. Accordingly, the above condition is significantly effective in suppressing light leakage from the tilted surface 25 and the emitting surface 22 in the vicinity of the tilted surface 25. Accordingly, placing the inflection point A at a position closer to the emitting surface 22 than the middle position of the light incident wedge portion 31 is technically significant as the condition for minimizing light leakage from the tilted surface 25 and the emitting surface 22 in the vicinity of the tilted surface 25, including the exceptional case where the distance L is smaller than the thickness T1 of the light incident surface 21.

Moreover, placing the inflection point A at a position closer to the emitting surface 22 than the middle position of the light incident wedge portion 31 normally corresponds to making the area of the convex part B (see FIG. 1B) larger than that of the concave part C (see FIG. 1B). In the case where the tilted surface 25 has such an extreme shape that the depth of the concave part C (i.e., the maximum distance between the concave portion 25e of the tilted surface 25 and the line segment q2) is significantly large with respect to the height of the convex part B (i.e., the maximum distance between the convex portion 25d of the tilted surface 25 and the line segment q1), the area of the convex part B may not be larger than that of the concave part C even if the inflection point P is located at a position closer to the emitting surface 22 than the middle position of the light incident wedge portion 31. However, the tilted surface 25 generally does not have such an extreme shape if designed appropriately according to the distribution of the degree of risk of light leakage. Accordingly, the condition that the area of the convex part B is made larger than that of the concave part C is technically significant as the condition for minimizing light leakage from the tilted surface 25 and the emitting surface 22 in the vicinity of the tilted surface 25, like placing the inflection point A at a position closer to the emitting surface 22 than the middle position of the light incident wedge portion 31.

In the above description, the ratio of the length K of the light incident wedge portion 31 to the maximum thickness T1 of the light incident wedge portion 31 is 1.78. However, the spread illuminating apparatus according to the present invention is not limited by the value of α. For example, in the case where the tilted surface 25 is a curved surface having an S-shape as viewed from the side as in the spread illuminating apparatus 10, it is preferable in some cases that α is about 1.78 to 2.2. However, even if a is in this range, the normalized distance $L_N$ is larger than 1.0 in the entire theoretical range of the wedge ratio (0<(T2/T1)<1), and thus the distance L in the light guide direction from the light incident surface 21 to the inflection point A needs to be larger than the thickness T1 of the light incident surface 21 (L>T1) in order to minimize light leakage from the tilted surface 25 and the emitting surface 22 in the vicinity of the tilted surface 25 in the spread illuminating apparatus 10, as in the case where α=1.78.

In the case where α<2.0, the inflection point A is placed at the position closer to the emitting surface 22 than the middle position of the light incident wedge portion 31, as described above for α=1.78. In the case of α>2.0, the length K of the light incident wedge portion 31 is larger than "2.0× maximum thickness T1 of the light incident wedge portion 31". Accordingly, the distance L is larger than the thickness T1 of the light incident surface 21 if the condition that the distance L is larger than half the length K of the light incident wedge portion 31 (in this case. K/2>T1) (that is, the inflection point A is located closer to the emitting surface 22 than the middle position of the light incident wedge portion 31) is satisfied. In other words, in the case where α>2.0, placing the inflection point A at a position closer to the emitting surface 22 than the middle position of the light incident wedge portion 31 is a condition that should be prioritized over making the distance 1, larger than the thickness T1 of the light incident surface 21, and is therefore effective as the condition for minimizing light leakage from the tilted surface 25 and the emitting surface 22 in the vicinity of the tilted surface 25.

Accordingly, the condition that the area of the convex part B is made larger than that of the concave part C is effective as the condition for minimizing light leakage from the tilted surface 25 and the emitting surface 22 in the vicinity of the tilted surface 25, as described above for α=1.78.

In the above description, the light guide plate 20 is molded from a polycarbonate resin (refractive index "n" of 1.58). However, the light guide plate 20 according to the present invention may be molded from other materials such as an acrylic resin (refractive index "n" of 1.49). In this case as well, the spread illuminating apparatus 10 has a similar characteristic to that described above regarding the optimal distance to the inflection point A for minimizing light leakage from the tilted surface 25 and the emitting surface 22 in the vicinity of the tilted surface 25.

As described above, in the spread illuminating apparatus 10, light leakage from the tilted surface 25 and the emitting surface 22 in the vicinity of the tilted surface 25 can be minimized by optimizing the distance in the light guide direction from the light incident surface 21 to the inflection point A.

In the spread illuminating apparatus 10, deriving the optimal distance to the inflection point A by using the expression for calculating the distance Le is also advantageous in that the optimal shape of the tilted surface 25 for minimizing light leakage from the tilted surface 25 and the emitting surface 22 in the vicinity of the tilted surface 25 can be easily designed in a short time.

Figure 11:
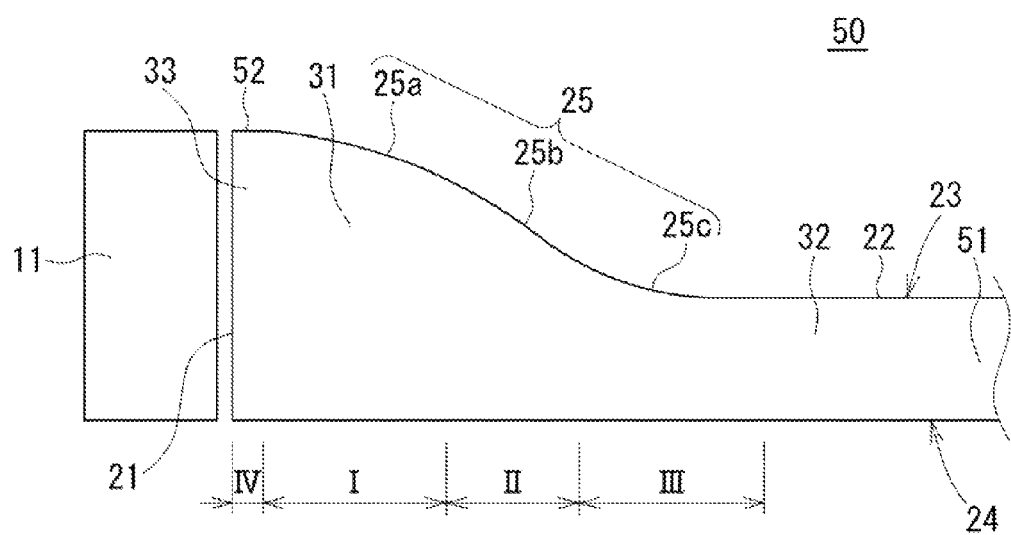
FIG. 11 is a side view showing a main part of a spread illuminating apparatus according to another embodiment of the present invention.

In the spread illuminating apparatus according to the present invention, a flat portion 33 (a range shown by "IV" in FIG. 11) may be provided between the light incident surface 21 and the light incident wedge portion 31 of a light guide plate 51, as in a spread illuminating apparatus 50 shown in FIG. 11. The flat portion 33 extends from the light incident surface 21 to connect to the first tilted surface portion 25a and has an upper surface 52 that is parallel to the emitting surface 22. The flat portion 33 has a constant thickness.

The spread illuminating apparatus 50 is similar to the spread illuminating apparatus 10 in all the characteristics except for having the flat portion 33. Since the length in the light guide direction of the flat portion 33 is normally about 50 μm, the length of the light incident wedge portion 31 in the spread illuminating apparatus 50 can be regarded as including the length of the flat portion 33.

In the above embodiments, the section (side section) of the light incident wedge portion 31 of the light guide plate 20 taken along a plane perpendicular to the light incident surface 21 and the emitting surface 22 has the same shape as its lateral shape at any position in the longitudinal direction of the light incident surface 21. Accordingly, the tilted surface 25 is not tilted in the longitudinal direction of the light incident surface 21. In the spread illuminating apparatus according to the present invention, the tilted surface of the light incident wedge portion may be shaped so as to be tilted in the longitudinal direction of the light incident surface 21.

Figure 12A:
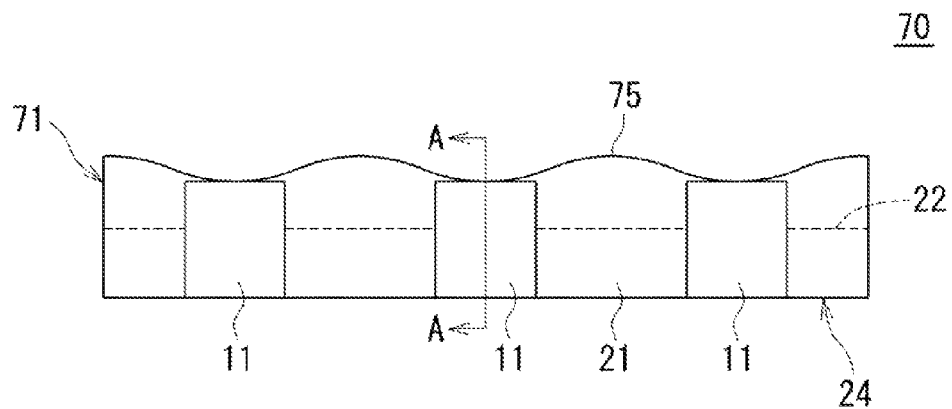
FIG. 12A is an elevation view showing a main part of a spread illuminating apparatus according to still another embodiment of the present invention.
Figure 12B:
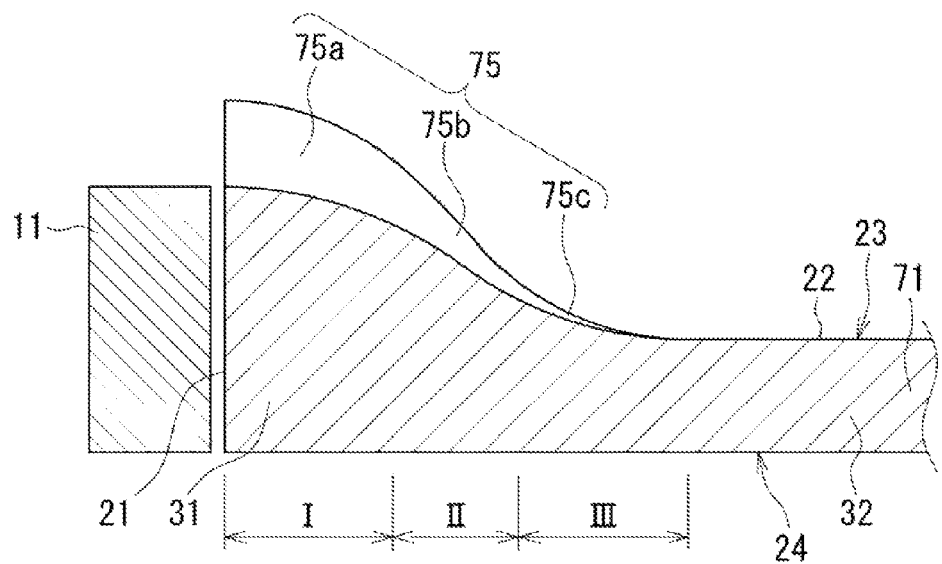
FIG. 12B is a sectional view taken along line A-A in FIG. 12A.

FIGS. 12A and 12B show an example of such a spread illuminating apparatus 70. FIG. 12A is a front view (elevation view) of the spread illuminating apparatus 70 as viewed from the light incident surface 21 side, and FIG. 12B is a sectional view taken along line A-A in FIG. 12A. In the spread illuminating apparatus 70, the thickness of the light incident surface 21 of a light guide plate 71 spatially varies in the longitudinal direction of the light incident surface 21. Specifically, the light incident surface 21 is configured so that the thickness of the light incident surface 21 at the position of each LED 11 is about the same as that of the LED 11, and the thickness of the light incident surface 21 on both sides of the position of each LED 11 is larger than that of the light incident surface 21 at the position of each LED 11. A tilted surface 75 is configured so as to be tilted downward from the light incident surface 21 toward the front along the entire width in the longitudinal direction of the light incident surface 21, and to connect to the emitting surface 22 at the front end of the tilted surface 75.

The tilted surface 75 is thus tilted not only in the front-rear direction (light guide direction) but also in the left-right direction (longitudinal direction of the light incident surface 21). With this configuration, the average tilt angle of the tilted surface 75 along the entire length of the light incident wedge portion 31 also spatially varies in the longitudinal direction of the light incident surface 21 so as to be minimized at the position of each LED 11 and to be maximized on both sides of the position of each LED 11.

However, in the spread illuminating apparatus 70, the shape of the side section of the tilted surface 75 at any position in the longitudinal direction of the light incident surface 21 is similar to that of the titled surface 25 of the spread illuminating apparatus 10 described above with reference to FIGS. 1A and 1B.

With the above configuration, the spread illuminating apparatus 70 has similar functions and advantageous effects to those of the spread illuminating apparatus 10. In addition, the tilted surface 75 is tilted also in the longitudinal direction of the light incident surface 21. Accordingly, light incident on the tilted surface 75 at various incident angles in the thickness direction is reflected so as to spread in the direction parallel to the emitting surface 22. This can reduce the incident angle that is formed when the reflected light from the tilted surface 75 is incident again onto the tilted surface 75 (typically, the third tilted surface portion 75c) after being reflected by the back surface 24. This can more effectively reduce light leakage from the tilted surface 75 and the emitting surface 22 in the vicinity of the light incident wedge portion 31.

In the spread illuminating apparatus 70, the length of the light incident wedge portion 31 is constant in the longitudinal direction of the light incident surface 21. However, in the spread illuminating apparatus according to the present invention, the tilted surface of the light incident wedge portion 31 may be tilted in the longitudinal direction of the light incident surface 21 by spatially varying the length of the light incident wedge portion 31 in the longitudinal direction of the light incident surface 21. In this case, spatial variation in average tilt angle of the tilted surface along the entire length of the light incident wedge portion 31 in the longitudinal direction of the light incident surface 21 can be reduced to a relatively small value as compared to the spread illuminating apparatus 70 shown in FIGS. 12A and 12B.

In the above embodiments, the tilted surfaces 25, 75 are continuous along the entire width of the light guide plate 20. However, the tilted surfaces 25, 75 may discontinuously extend along the width direction of the light guide plate 20. In this case, the tilted surfaces 25, 75 are desirably provided in the range including a region in front of each LED 11.

In the above embodiments, the tilted surfaces 25, 75 of the light incident wedge portion 31 are formed on the front surface 23 side of the light guide plates 20, 51, 71. However, in the spread illuminating apparatus according to the present invention, the tilted surfaces 25, 75 may be formed on the back surface 24 side of the light guide plates 20, 51, 71. Alternatively, the spread illuminating apparatus according to the present invention may have the tilted surface of the light incident wedge portion 31 on both the front surface 23 side and the back surface 24 side of the light guide plates 20, 51, 71, and one or both of the two tilted surfaces may be formed as the tilted surfaces 25, 75 of the present invention. In the case where only one of the two tilted surfaces is formed as the tilted surfaces 25, 75 of the present invention, the other tilted surface may be a tilted surface having a constant tilt angle as in the conventional example.

In the case where an FPC having the LED 11 mounted thereon is placed on one of the front surface 23 and the back surface 24 of the light guide plates 20, 51, 71 which has the tilted surface (the tilted surfaces 25, 75 of the present invention or the conventional tilted surface), a seat block may be provided to place the FPC integrally with the tilted surface provided on this surface. For example, this seat block is provided in a predetermined range which extends forward from both lateral sides of the position of each LED 11 on the light incident surface 21 (preferably, a region on which light is hardly incident).

For example, in the spread illuminating apparatus according to the present invention, a known prism (a plurality of prisms having a triangular section and extending forward) that totally reflects incident light may be formed in a region forward of the inflection point A on the tilted surfaces 25, 75. Since the prism is provided in the region of the tilted surfaces 25, 75 which is located closer to the emitting surface 22 and which has a larger degree of risk of light leakage, luminance can further be improved and uniform luminance can be achieved. In this case, it is preferable that the prism have the same sectional shape at any position in the longitudinal direction of the light incident surface 21, like the tilted surface 25. For example, a dot that scatters light, etc. may be provided instead of the prism in view of uniformity of luminance etc.

The spread illuminating apparatus according to the present invention need not necessarily be configured so that the entire tilted surfaces 25, 75 are curved surfaces. For example, the tilted surfaces 25, 75 may include one or more surfaces having a constant tilt angle. For example, the entire shape of the tilted surfaces 25, 75 as viewed from the side may be an S-shape that is formed by a polygonal line.

It should be understood that the spread illuminating apparatus according to the present invention includes spread illuminating apparatuses including any combinations of the characteristics described above in the individual embodiments. For example, the spread illuminating apparatus 70 may include the flat portion 33 described in the spread illuminating apparatus 50.

What is claimed is:

1. A spread illuminating apparatus, comprising:
   a light source; and
   a light guide plate having a light incident surface as an end face on which the light source is placed, and an emitting surface that is included in a surface connecting to one of two end sides in a longitudinal direction of the light incident surface and that emits light incident on the light incident surface, wherein
   the light guide plate has a light incident wedge portion integrally formed with the light guide plate, the light guide plate and the light incident wedge portion being both made of a transparent material,
   the light incident wedge portion includes a tilted surface,
   a thickness of the light incident wedge portion is reduced from the light incident surface side toward the emitting surface side,
   the tilted surface has an S-shape as viewed from a side, which has a convex portion on the light incident surface side and a concave portion on the emitting surface side with an inflection point therebetween, and
   a distance from the light incident surface to the inflection point is larger than the thickness of the light incident surface.

2. The spread illuminating apparatus according to claim 1, wherein
   a sectional shape of the tilted surface which is perpendicular to the light incident surface and the emitting surface is the same at any position in the longitudinal direction of the light incident surface.

3. The spread illuminating apparatus according to claim 1, wherein
   the tilted surface is provided on the emitting surface side.

4. The spread illuminating apparatus according to claim 3, wherein
   a sectional shape of the tilted surface which is perpendicular to the light incident surface and the emitting surface is the same at any position in the longitudinal direction of the light incident surface.

5. The spread illuminating apparatus according to claim 1, wherein
   the inflection point is located in a range of 1.1 times to 1.7 times the thickness of the light incident surface from the light incident surface, both inclusive.

6. The spread illuminating apparatus according to claim 5, wherein
   a sectional shape of the tilted surface which is perpendicular to the light incident surface and the emitting surface is the same at any position in the longitudinal direction of the light incident surface.

7. The spread illuminating apparatus according to claim 5, wherein
   the tilted surface is provided on the emitting surface side.

8. The spread illuminating apparatus according to claim 7, wherein
   a sectional shape of the tilted surface which is perpendicular to the light incident surface and the emitting surface is the same at any position in the longitudinal direction of the light incident surface.

9. A spread illuminating apparatus, comprising:
   a light source; and
   a light guide plate having a light incident surface as an end face on which the light source is placed, and an emitting surface that is included in a surface connecting to one of two end sides in a longitudinal direction of the light incident surface and that emits light incident on the light incident surface, wherein
   the light guide plate has a light incident wedge portion integrally formed with the light guide plate, the light guide plate and the light incident wedge portion being both made of a transparent material,
   the light incident wedge portion includes a tilted surface, a thickness of the light incident wedge portion is reduced from the light incident surface side toward the emitting surface side, the tilted surface has an S-shape as viewed from a side, which has a convex portion on the light incident surface side and a concave portion on the emitting surface side with an inflection point therebetween, and the inflection point is located closer to the emitting surface than a middle position of the light incident wedge portion.

10. The spread illuminating apparatus according to claim 9, wherein
a sectional shape of the tilted surface which is perpendicular to the light incident surface and the emitting surface is the same at any position in the longitudinal direction of the light incident surface.

11. The spread illuminating apparatus according to claim 9, wherein
the tilted surface is provided on the emitting surface side.

12. The spread illuminating apparatus according to claim 11, wherein
a sectional shape of the tilted surface which is perpendicular to the light incident surface and the emitting surface is the same at any position in the longitudinal direction of the light incident surface.

13. A spread illuminating apparatus, comprising:
a light source; and
a light guide plate having a light incident surface as an end face on which the light source is placed, and an emitting surface that is included in a surface connecting to one of two end sides in a longitudinal direction of the light incident surface and that emits light incident on the light incident surface, wherein the light guide plate has a light incident wedge portion integrally formed with the light guide plate, the light guide plate and the light incident wedge portion being both made of a transparent material, the light incident wedge portion includes a tilted surface, a thickness of the light incident wedge portion is reduced from the light incident surface side toward the emitting surface side, the tilted surface has an S-shape as viewed from a side, which has a convex portion on the light incident surface side and a concave portion on the emitting surface side with an inflection point therebetween, and an area of a convex part located on the light incident surface side of the inflection point as viewed from the side is larger than that of a concave part located on the emitting surface side of the inflection point as viewed from the side.

14. The spread illuminating apparatus according to claim 13, wherein
a sectional shape of the tilted surface which is perpendicular to the light incident surface and the emitting surface is the same at any position in the longitudinal direction of the light incident surface.

15. The spread illuminating apparatus according to claim 13, wherein
the tilted surface is provided on the emitting surface side.

16. The spread illuminating apparatus according to claim 15, wherein
a sectional shape of the tilted surface which is perpendicular to the light incident surface and the emitting surface is the same at any position in the longitudinal direction of the light incident surface.

* * * * *